United States Patent [19]
Simmons

[11] Patent Number: 5,839,068
[45] Date of Patent: Nov. 17, 1998

[54] METHOD OF DELIVERING SERVICE VOICE ANNOUNCEMENTS IN A SATELLITE TELEPHONY COMMUNICATION SYSTEM

[75] Inventor: Nigel Simmons, Potomac, Md.

[73] Assignee: Hughes Electronics Corporation, El Segundo, Calif.

[21] Appl. No.: 731,680

[22] Filed: Oct. 17, 1996

Related U.S. Application Data

[63] Continuation of Ser. No. 394,028, Feb. 21, 1995, abandoned.

[51] Int. Cl.$^6$ .................................................. H04O 7/20
[52] U.S. Cl. ........................ 455/427; 455/12.1; 455/430; 455/526
[58] Field of Search .................................. 379/56, 57, 58, 379/67, 88; 455/12.1, 13.1, 56.1, 34.1, 57.1, 18, 426, 427, 430, 450, 509, 510, 515, 524, 526, 454

[56] References Cited

U.S. PATENT DOCUMENTS

| | | | |
|---|---|---|---|
| 4,414,431 | 11/1983 | McCoskey | 342/352 |
| 4,833,477 | 5/1989 | Tendler | 342/389 |
| 5,133,081 | 7/1992 | Mayo | 455/18 |
| 5,216,427 | 6/1993 | Yan et al. | 342/352 |
| 5,375,164 | 12/1994 | Jennings | 379/88 |

Primary Examiner—Dwayne D. Bost
Assistant Examiner—Nay Maung
Attorney, Agent, or Firm—John Whelan; Michael Sales

[57] ABSTRACT

A satellite telephony communication system is used to provide a method of delivering service voice announcements to remote ground transceivers in the satellite telephony system. A relatively small portion of the satellite's bandwidth is dedicated to broadcasting periodic service voice announcements. When an announcement is desired, the remote ground transceiver tunes to the announcement frequency and retrieves the desired announcement in the broadcast sequence. Preferably, the announcements are broadcast in bursts, with a control data burst repeated periodically among the announcement bursts. The control data burst notifies the ground transceiver about the location and duration of each broadcast announcement, thus allowing the transceiver to time its voice path connection to the announcement frequency such that it starts at the beginning of the desired announcement and terminates at the end of the desired announcement.

19 Claims, 4 Drawing Sheets

METHOD OF DELIVERING SERVICE VOICE ANNOUNCEMENTS IN A SATELLITE TELEPHONY COMMUNICATION SYSTEM

This application is a Continuation of application Ser. No. 08/394,028 filed on Feb. 21, 1995, now abandoned.

BACKGROUND OF THE INVENTION

Satellite telephony communication systems have been increasingly used as a relatively quick and inexpensive method of providing telephone communication to remote areas. Conventional satellite telephony systems do not require the same amount of land-based infrastructure required to support other telephone systems such as a conventional public switched telephone network (PSTN) or a cellular telephone system.

The typical satellite telephony system uses geosynchronous satellites to couple voice channel communication from one remote ground transceiver to a PSTN, or between two remote ground transceivers in the satellite telephony system. Each remote ground transceiver generally includes a conventional telephone connected via a channel unit to a very small aperture terminal (VSAT). The channel unit includes programmed processors and other hardware circuitry necessary for coupling satellite communications from the VSAT to the telephone, coupling user communications from the telephone to the satellite, and controlling other operations associated with sending and receiving voice communications.

The typical remote ground transceiver is a relatively small and self-contained device. Thus, it is rather easily installed wherever there is electric power and a clear path to point the VSAT toward the satellite. A typical VSAT antenna measures approximately 6–8 feet in diameter. A channel unit that supports one telephone trunk is approximately 12 inches wide, ½ inch high, and 17 inches deep. Accordingly, a user can be provided access to the satellite telephony system by simply installing a telephony ground transceiver and nothing more. By coupling the user via satellite to a PSTN, each ground transceiver connects remote locations, having little or no land-based telephony infrastructure, to telephone systems all over the world.

It is often desirable in telephony systems to provide what are known as "service voice announcements" to users. For example, after placing a long distance call through "XXX" company, the caller may hear the service voice announcement "Thank you for using XXX." Or, if a caller dials a predetermined telephone number, he/she may be provided with service voice announcements reciting the local time, local temperature, or other information. Such announcements are typically provided by way of point-to-point communication established between the user and special equipment that provides the service voice announcements. If such equipment were applied directly to satellite telephony communication systems, a fairly substantial capacity and satellite access would need to be provided in order to connect each remote ground transceiver the equipment in a point-to-point technique each time a message was needed. The capacity would need to be enough to serve the peak demand, and accordingly, such capacity would be idle during non-peak periods.

Thus, it would be beneficial to provide a simple, easily implemented, and flexible method of providing service voice message announcements in a satellite telephony communication system.

SUMMARY OF THE INVENTION

The present invention provides a method of transmitting service voice announcements in a satellite telephony communication system. A suitable satellite telephony communication system includes several remote ground transceivers and a satellite through which all communications are routed. A conventional ground transceiver includes a telephone, a channel unit coupled to the telephone, and a very small aperture terminal (VSAT) coupled to the channel unit. At least one of the remote ground transceivers is coupled to a public switched telephone network (PSTN). Thus, point-to-point communication, via the satellite, may be established between the remote ground transceivers, or between a remote ground transceiver and the PSTN.

In the preferred embodiment of the present invention, service voice announcements are made continuously available in a satellite-based telephony communication system of the type described above. The method of the present invention includes the steps of providing more than one remote ground transceiver, providing point-to-point telephony communication (via a satellite) between at least two of the remote ground transceivers, and broadcasting the service voice announcements on an "announcement" frequency via the satellite. The remote ground transceivers are capable of tuning to the announcement frequency and receiving a desired service voice announcement whenever needed.

The method of the present invention may also include the step of continuously broadcasting a plurality of distinct service voice announcements in bursts, and periodically broadcasting among the service voice announcement bursts at least one control burst. A remote ground transceiver receives a particular service voice announcement by first tuning to the announcement frequency then looking for the control burst. The control burst contains information about the various service voice announcement bursts that follow it, including the number of announcements, the starting and ending position of each announcement, the contents of each announcement, and/or the duration of each announcement. The ground transceiver uses the information in the control data burst to determine the position of the announcement of interest, opens the voice path at the beginning of the announcement, and terminates the voice path when the announcement is completed. Thus, each announcement is selected and delivered complete, not picked up in the middle of a sentence.

In an even further embodiment of the invention, the service voice announcement is transmitted to the satellite by a special ground transceiver that includes a source of service voice announcements and control bursts.

The invention itself, together with further objects and attendant advantages, will best be understood by reference to the following detailed description, taken in conjunction with the accompanying drawings.

DETAILED DESCRIPTION OF THE DRAWINGS

Figure 1:
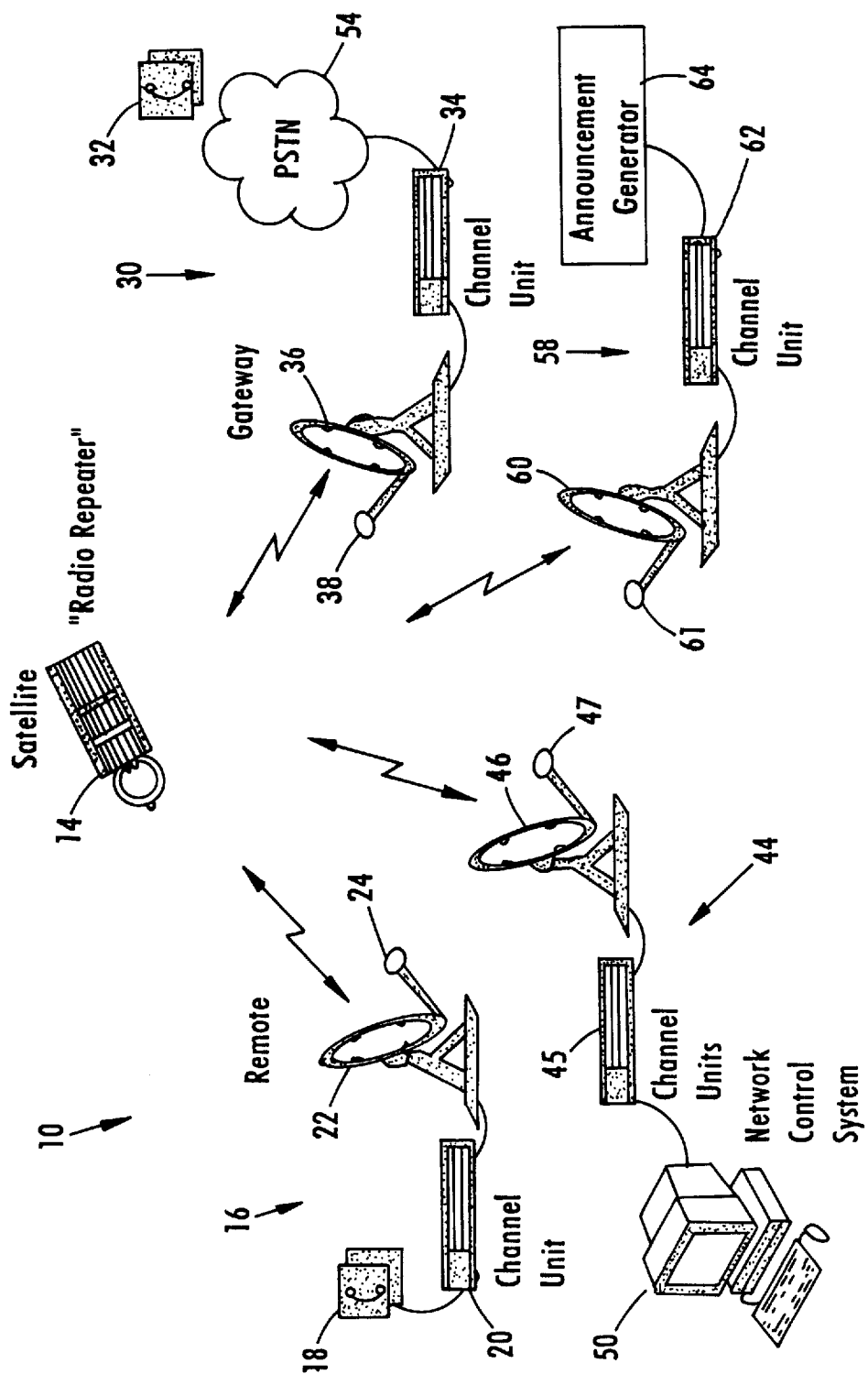
FIG. 1 is a diagram of a satellite telephony communication system embodying the present invention.

The present invention is a method of providing service voice announcements in a satellite telephony communication system, also known as a satellite mesh telephony network. For example, after entering the required identification and telephone number information for placing a long distance telephone call, the long distance carrier may wish to transmit to the user an announcement such as "Thank you for using XXX." Ordinarily, such announcements would have to be provided by way of point-to-point communication established between the user and special equipment that provides such service voice announcements. If such equipment were applied directly to satellite telephony communication systems, a fairly substantial capacity and satellite access would need to be provided to connect each remote ground transceiver to the equipment in a point-to-point technique each time a message was needed. The capacity would need to be enough to serve the peak demand, and accordingly, such capacity would be idle during non-peak periods.

The method of the present invention is preferably implemented in a satellite telephony communication system. Such a system uses a geosynchronous satellite to couple point-to-point communication from one remote ground transceiver to another, or from one remote ground transceiver to a public switched telephone network (PSTN). The method of the present invention provides service voice announcements to the entire satellite telephony system by reserving a relatively small portion of the satellite bandwidth for "announcements," and continuously broadcasting suitable service voice announcements from the satellite on the reserved announcement frequency channels. Whenever the satellite telephony system determines that an announcement should be delivered to a user, the user's ground transceiver (more particularly, the channel unit) tunes to the announcement channel and, using synchronization found in the broadcast, selects the desired broadcast service voice announcement and passes it directly to the user in the voice path.

Preferably, the voice announcements are transmitted in the form of transmission bursts, each having a preamble and postamble to allow correct signal acquisition and demodulation. Synchronization is provided by a control data burst transmitted between each repeating sequence of announcements. The control data burst contains information about the broadcast announcements, including the amount, content, position, and duration of each announcement in the sequence. After tuning to the announcement frequency channel, the ground transceiver first looks for the control data burst. Using the information in the control data burst, the ground transceiver locates the desired service voice announcement in the broadcast, starts its voice connection to the announcement channel at the beginning of the desired announcement, and ends its voice connection to the announcement channel at the end of the desired announcement. Thus, only complete announcements are passed to the user.

At the relatively small cost of satellite bandwidth, all user's in the satellite telephony system can be provided with a variety of announcements which otherwise would have required each user to open a point-to-point communication with one of several dedicated announcement storage devices. Moreover, because the present invention allows the announcements to originate from a single point, the content of the announcements can be readily changed and instantly made available to the entire system of ground transceiver.

Thus, the method of the present invention is an effective mechanism for making available a large variety of time-critical announcement applications, for example, speaking clock, emergency information, and customized messages ("good morning," "good evening").

The method of the present invention may be implemented on conventional satellite telephony systems using their existing hardware capabilities. The basic operations performed in carrying out the method include broadcasting from a satellite on a predetermined frequency channel, tuning the ground transceiver to a particular frequency to open a voice communication path via the satellite, and broadcasting voice information in bursts. These functions, although not previously performed in the combination of the present invention, may be implemented on a conventional satellite telephony system by one of ordinary skill in satellite telephony communications using the parameters set forth in the present disclosure.

FIG. 1 is a diagrammatic illustration of a satellite telephony system 10 embodying the features of the present invention. The satellite telephony system 10 is preferably a single channel per carrier (SCPC) demand access multiple assignment (DAMA) system. As illustrated, the system 10 includes a geosynchronous satellite 14, at least one remote ground transceiver 16, at least one "gateway" ground transceiver 30 providing connection to a public switched telephone network (PSTN) 54, a network control system (NCS) 44, and a message station 58. Although one remote ground transceiver 16 and one gateway ground transceiver 30 are illustrated in FIG. 1, it is understood that the system 10 typically includes several remote ground transceivers and gateway ground transceivers. Each ground transceiver 16 generally comprises a conventional telephone 18 coupled (directly or indirectly) to a channel unit 20. The channel unit 20 is coupled to a very small aperture terminal (VSAT) 22. The gateway ground transceiver 30 also includes a VSAT 36 coupled to a channel unit 34. The channel unit 34 is coupled to the PSTN 54 which connects the system 10 to the various telephones 32.

The NCS 44 of the satellite telephony system 10 includes a VSAT 46 coupled to a programmed computer 50. The message station 58 of the system 10 includes a VSAT 60 coupled to a channel unit 62 which is coupled to an announcement generator 64.

The antennas (22, 36, 46, and 60) generally include a radio transceiver/translator (24, 38, 47, or 61) for transmitting signals to the satellite 14, receiving signals from the satellite 14, and translating the received and transmitted signal to the appropriate frequency range. Signals directed to the satellite typically arrive at the radio in the MHz frequency range, are translated to the GHz frequency, then transmitted through the airwaves to the satellite 14. Signals received from the satellite typically arrive at the radio in the GHz frequency range, are translated to the MHz frequency range, then transmitted through a cable to the downstream component (channel units 20, 34, 62, or programmed computer 50).

The VSAT antennas 22, 36, 46, 60 are connected to channel units 20, 34, 45, 62. The channel units 20, 34, 45, 62 each support one or more terrestrial interfaces (not shown), each of which provides a single telephony trunk, or a single subscriber loop. Each interface includes programmed processors and other circuitry for coupling satellite communications from the VSAT antenna (22, 36, 46, or 60) to either the telephone 18 or PSTN 54 or PC 50 or announcement generator 64. The interface further couples user communications from the telephone 18, PSTN 54, PC 50 or announcement generator 64 to the satellite 14, couples message communications from the announcement generator 64 to the satellite 14, and controls other operations associated with sending and receiving voice communications. Thus, each channel unit 20, 34, 45, 62 supports at least one voice connection. For the remote channel units 20 the voice connection is full duplex.

In the NCS 44, the VSAT antenna 46 is connected to a programmed computer 50 which may be a conventional PC. The computer 50 is programmed in a conventional manner to perform the necessary control and synchronization functions to allow the ground transceivers 16, 30 to place and received calls to and from each other, and to and from the PSTN 54.

In the message station 58, the channel unit 62 is connected to an announcement generator 64 capable of generating the service voice announcement that will be transmitted to the satellite 14 and broadcast from the satellite 14 to all ground transceivers 16, 30 in the satellite telephony system 10. Thus, one announcement generator 64 can supply service voice announcements to the entire system 10. Preferably, the announcement generator 64 is any conventional device capable of storing and/or generating voice announcements and supplying them to the channel unit 62. A suitable announcement generator 64 is a conventional PC, equipped with the necessary interface cards to take the place of a conventional telephone, and programmed to repeatedly cycle through the desired announcements. Such PC interfaces are widely available and typically used to provide answering service or intelligent telephone routing functions.

The ground transceivers 16, 30 communicate primarily with the NCS 44. The NCS 44 is responsible for managing the remote ground transceivers 16 and gateway ground transceivers 30, and allocating satellite bandwidth in the form of SCPC circuits on the geostationary satellite 14 (shown in FIG. 1). All communication in the system 10 is via the satellite 14.

Figure 2:
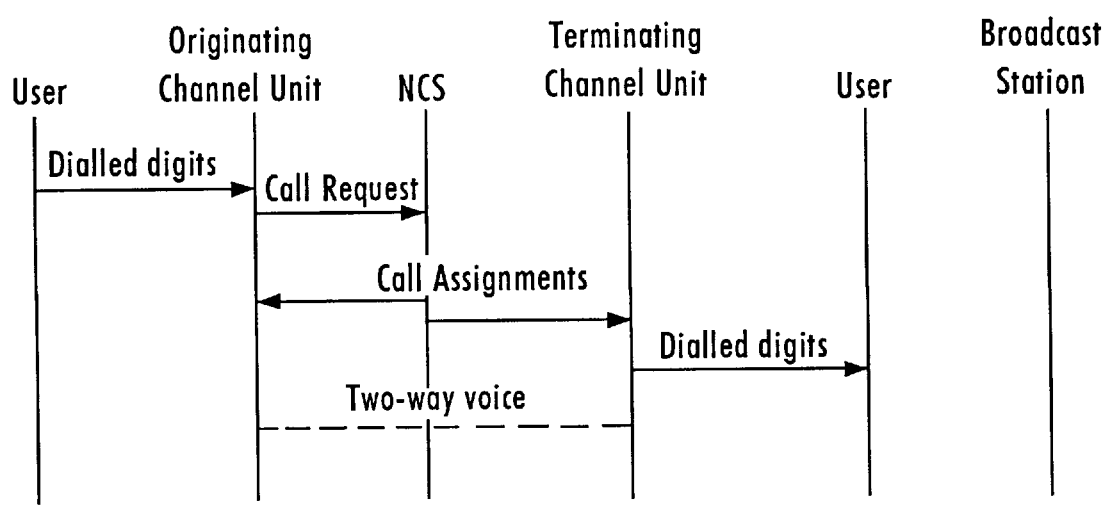
FIG. 2 is a ladder diagram illustrating the call set up procedures used in the satellite telephony system shown in FIG. 1.
Figure 3:
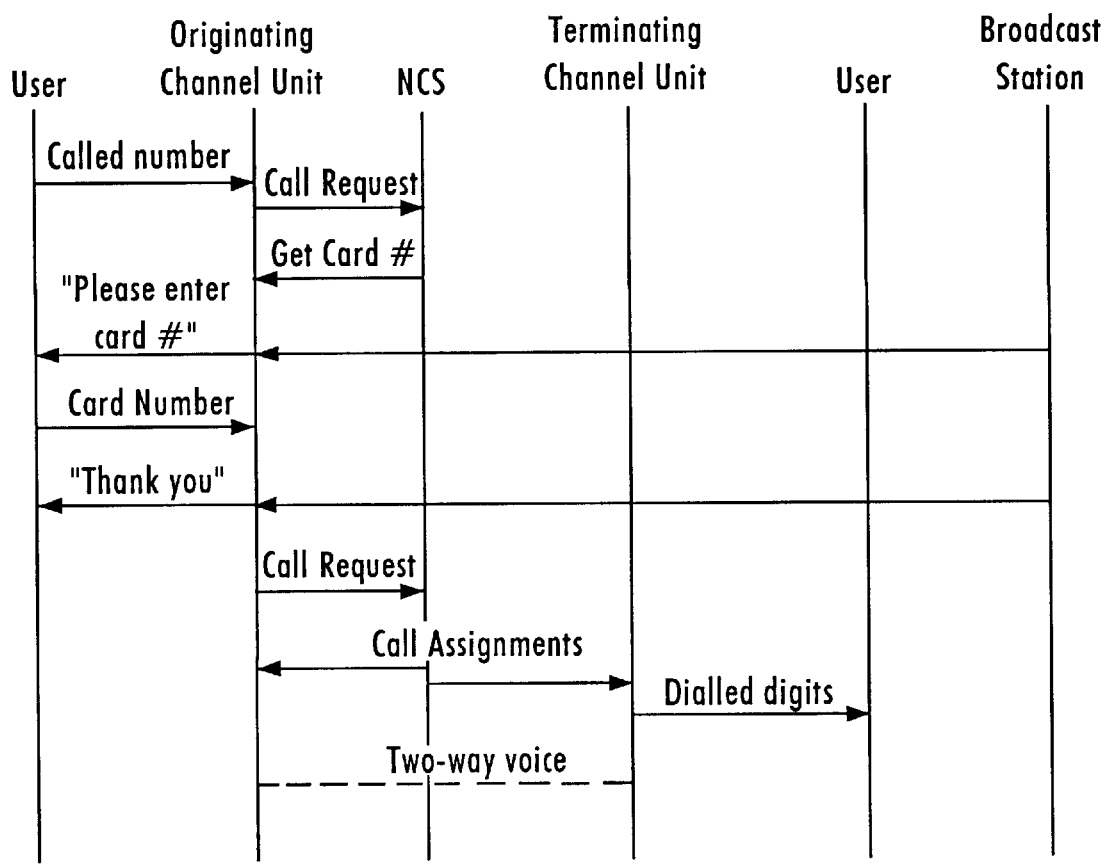
FIG. 3 is another ladder diagram illustrating a service voice announcement broadcast from the satellite in the satellite telephony communication system shown in FIG. 1.

FIG. 2 is a ladder diagram illustrating the call set up procedures used in the satellite telephony system 10 shown in FIG. 1, and FIG. 3 is another ladder diagram illustrating one example of a service voice announcement broadcast from the satellite 14 in the satellite telephony system 10 shown in FIG. 1. Referring to FIGS. 2 and 3, a call connection is established by the following steps. An "originating channel unit" receives address digits at its terrestrial interface resulting from a user telephone dialing pattern. These digits are forwarded to the NCS 44 which selects the appropriate "terminating channel unit" (and/or PSTN destination) for termination of the call by analyzing the digits. The NCS 44 then assigns a pair of SCPC frequencies to both the originating and terminating units. In order to establish a two-way circuit, both the originating ground channel unit and the terminating channel unit re-tune their respective radio transceivers to a duplex voice channel assigned by the NCS 44. The ground transceivers are then no longer in communication with the NCS 44 directly.

FIG. 3 illustrates an example of how the method of the present invention may be used to provide service voice announcements in connection with a user placing a telephone call with a phonecard. The user dials his/her telephone number which is passed to the NCS. The NCS recognizes that this call needs a phonecard number to bill to, and thus must collect the phonecard digits. The NCS instructs the originating channel unit to tune to the announcement channel and obtain therefrom the message "Please enter card number." The originating unit then collects the digits, then tunes again to the announcement channel and retrieves the announcement "Thank you." Conventional call setup then proceeds.

In providing service voice announcements to the ground transceivers 16, the present invention reserves a small part of the satellite spectrum for simplex broadcast voice announcement channels, where each channel has a continually repeating sequence of announcements broadcast from the satellite 14 and originating from a dedicated message station 58. Compared to the total bandwidth required to support regular two-way voice circuits, these simplex broadcast channels occupy a relatively small part of the satellite's available bandwidth.

Figure 4:
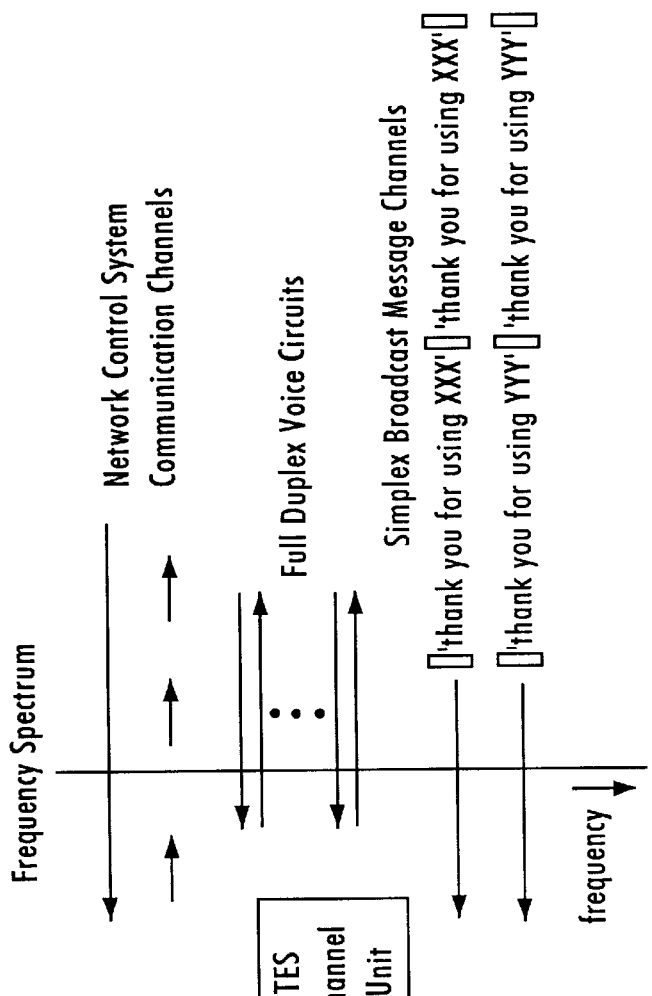
FIG. 4 illustrates the different uses of the satellite spectrum by the remote ground transceivers shown in FIG. 1, including the use of an announcement channel to receive broadcast voice service announcements.

FIG. 4 illustrates the different uses of the satellite spectrum by the channel units shown in FIG. 1, including the use of an announcement channel for broadcasting simplex messages. As illustrated, the frequency spectrum is primarily occupied by NCS communication channels and full duplex voice circuit channels. The method of the present invention adds the simplex broadcast message channels which take up considerably less space than NCS communication channels and full duplex voice circuit channels. For example, in a typical satellite telephony system, the NCS communication channels may occupy from about 100 KHz to about 200 KHz, and the full duplex voice channels may occupy from about 1 MHz to about 20 MHz. In the method of the present invention, the simplex broadcast message channel may be assigned the frequency range from about 30 KHz to about 60 KHz. This is only about 2% or less of the bandwidth being used by rest of the satellite telephony system.

Figure 5:
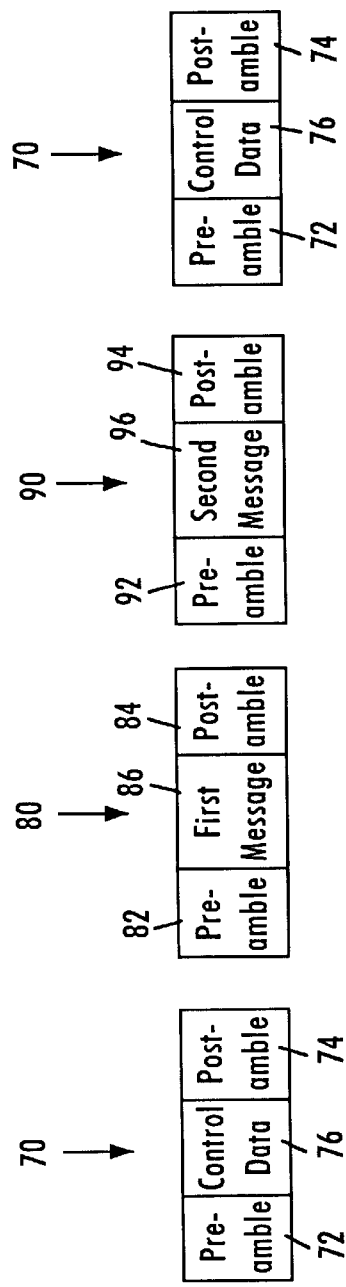
FIG. 5 illustrates a burst format for the broadcast voice service announcements shown in FIGS. 3 and 4.

In order to provide proper message sequencing, the method of the present invention calls for broadcasting the service voice announcements as bursts. The use of bursts in satellite communication is known, and the burst format may be conventionally generated using the channel units 20, 34, 46, 60. A simplified example of how the burst format is used in connection with the method of the present invention is illustrated in FIG. 5. As shown in FIG. 5, the announcement channel is provided with a control data burst 70, followed by a first voice announcement 80 and a second voice announcement 90. The control data burst 70 includes a preamble 72, a postamble 74, and control data 76. The first voice announcement 80 includes a preamble 82, a postamble 84, and a payload 86 comprising the actual voice announcement, for example, "Thank you for using XXX." The second voice announcement 90 includes a preamble 92, a postamble 94 and a payload 96 comprising another actual voice announcement, for example, "Thank you for using YYY." In general, the disclosed preambles and postambles are conventional and used primarily to allow correct signal acquisition and demodulation.

The control data burst 70 (identified in the preamble information) is generated between each repeating sequence of announcements. The payload 76 of the data burst 70 contains information about the lengths and contents of the successive bursts of voice information. The data burst 70 is used to allow the channel units to synchronize their timing, and to permit a single complete voice announcement to be passed to the user. Using the information in the control data burst, the ground transceiver knows the location of the desired voice announcement on the announcement channel, starts its voice connection to the announcement channel at the beginning of the desired announcement, and ends its voice connection to the announcement channel at the end of the desired announcement. Thus, only complete service voice announcement are passed to the user.

Thus, the present invention may find a wide range of applications beyond the specific example of relatively simple and short service voice announcements. More complex and longer announcements, such as emergency instructional information, or even classroom lectures, can be made available to users on specially reserved announcement channels.

Thus, at the relatively small cost of satellite bandwidth, the user in a satellite telephony communication system can be provided with a variety of announcements which would have required opening a point-to-point communication with some form of dedicated storage. Following the method of the present invention, the content of the announcements can be readily changed and instantly made available to the entire system of ground transceivers. Importantly, the method of the present invention may be implemented in conventional satellite telephony communication systems using their existing hardware capabilities. The basic operations performed in carrying out the method include broadcasting from a satellite on a predetermined frequency channel, tuning the ground transceiver to a particular frequency to open a voice communication path via the satellite, and broadcasting voice information in bursts. These functions, although not previously performed in the combination of the present invention, may be implemented on a conventional satellite telephony communication system by one of ordinary skill in the satellite telephony art using the parameters set forth in the present disclosure.

Of course, it should be understood that a wide range of changes and modifications can be made to the preferred embodiment described above. It is therefore intended that the foregoing detailed description be regarded as illustrative rather than limiting and that it be understood that it is the following claims, including all equivalents, which are intended to define the scope of this invention.

What is claimed is:

1. A method of providing service voice announcements in a satellite telephony communication system, the steps comprising:
    providing more than one remote ground transceiver,
    initiating the establishment of point-to-point telephony communication via a satellite, between at least two of said more than one remote ground transceivers;
    said point-to-point telephony communication taking place over a communication channel assigned to providing said point-to-point telephony communication;
    broadcasting the service voice announcements on an announcement channel capable of being accessed simultaneously by any of said remote ground transceivers after commencement of said step of initiating the establishment of said point-to-point telephony communication; and
    tuning one of said more than one remote ground transceivers to said announcement channel to receive the service voice announcements after commencement of said step of initiating the establishment of said point-to-point telephony communication.

2. The method of claim 1 further comprising the step of providing a gateway ground transceiver connected to a public switched telephone network (PSTN), said telephony communication system capable of providing point-to-point telephony communication, via said satellite, between at least one of said more than one remote ground transceivers and said PSTN.

3. The method of claim 1 further comprising the step of repeatedly broadcasting the service voice announcements in bursts.

4. The method of claim 3 further comprising the step of broadcasting at least one control burst.

5. The method of claim 4 wherein said ground transceiver receives the service voice announcements on said announcement channel by:
    obtaining said control burst;
    using said control burst to determine a starting and ending position of a desired service voice announcement among the service voice announcements.

6. The method of claim 4 wherein:
    the service voice announcements comprises a plurality of distinct voice announcements; and
    said control bursts contain information about the number of voice announcements following each control burst.

7. The method of claim 6 wherein said control bursts contain information about the order in which said voice announcements follow said control burst.

8. The method of claim 6 wherein said control bursts contain information about the duration of each voice announcement that follows said control burst.

9. The method of claim 4 wherein said control bursts contain information about the content of each voice announcement that follows said control burst.

10. A method of acquiring service voice announcements in a satellite telephony communication system having a plurality of remote ground transceivers and being capable of placing at least two of said remote ground transceivers in point-to-point communication on an assigned communication channel via a satellite, the steps comprising:
    broadcasting said voice announcements on an announcement channel that can be tuned to simultaneously by any of said remote ground transceivers;
    tuning one of said ground transceivers To said announcement channel to receive said voice announcements when needed after commencement of said at least two said remote ground transceivers being placed in point-to-point telephony communication.

11. The method of claim 10 further comprising the step of providing a gateway ground transceiver connected to a public switched telephone network (PSTN), said telephony communication system capable of providing point-to-point telephony communication, via said satellite, between at least one of said remote ground transceivers and said PSTN.

12. The method of claim 10 further comprising the step of broadcasting said voice announcements in bursts.

13. The method of claim 12 further comprising the step of broadcasting at least one control burst.

14. The method of claim 13 wherein said ground transceiver receives said voice announcements on said announcement channel by:
    receiving said control burst;
    using said control burst to determine a starting and ending position of a desired voice announcement among said broadcast voice announcements.

15. The method of claim 14 wherein:
    said voice announcements comprise a plurality of distinct voice announcements; and
    said control burst contains information about the number of distinct voice announcements following each control burst.

16. The method of claim 15 wherein said control burst contains information about the order in which said distinct voice announcements follow each control burst.

17. The method of claim 15 wherein said control burst contain information about the duration of each distinct voice announcement following said control data burst.

18. A method of providing predetermined voice announcements in a satellite telephony communication system, the steps comprising:

providing more than one remote ground transceiver, each comprising a very small aperture terminal (VSAT), a channel unit, and a telephone;

providing a gateway transceiver connected to a public switched telephone network (PSTN);

providing a network control system having a VSAT, a channel unit, and a programmed computer;

said network control system controlling the establishment of point-to-point telephony communication, via a satellite, between at least two of said more than one remote transceivers, or between at least one of said more than one remote transceivers and said PSTN;

said call establishment procedures initiated by an originating transceiver making a call request to said network control system on a network control communication channel;

providing a voice announcement source ground transceiver for transmitting said voice announcements to said satellite;

broadcasting the voice announcements in bursts on an announcement channel via said satellite whereby said more than one remote ground transceivers are all capable of simultaneously tuning to said announcement channel and receiving said voice announcements;

broadcasting from said satellite at least one control burst;

said network control system, after commencement of said cell establishment, instructing said originating ground transceiver to leave said network control system communication channels and tune to said announcement channel, said ground transceiver receiving said voice announcements on said announcement channel by receiving said control burst, then using said control burst to determine a starting and ending position of a desired voice announcement among said broadcast voice announcements.

19. The method of claim 18 wherein:

said voice announcements comprise a plurality of distinct voice announcements; and said control burst contains information about the number of distinct voice announcements following each control burst, the order in which said distinct voice announcements follow each control burst, and the duration of each distinct voice announcement following said control data burst.

\* \* \* \* \*